Figure 1:
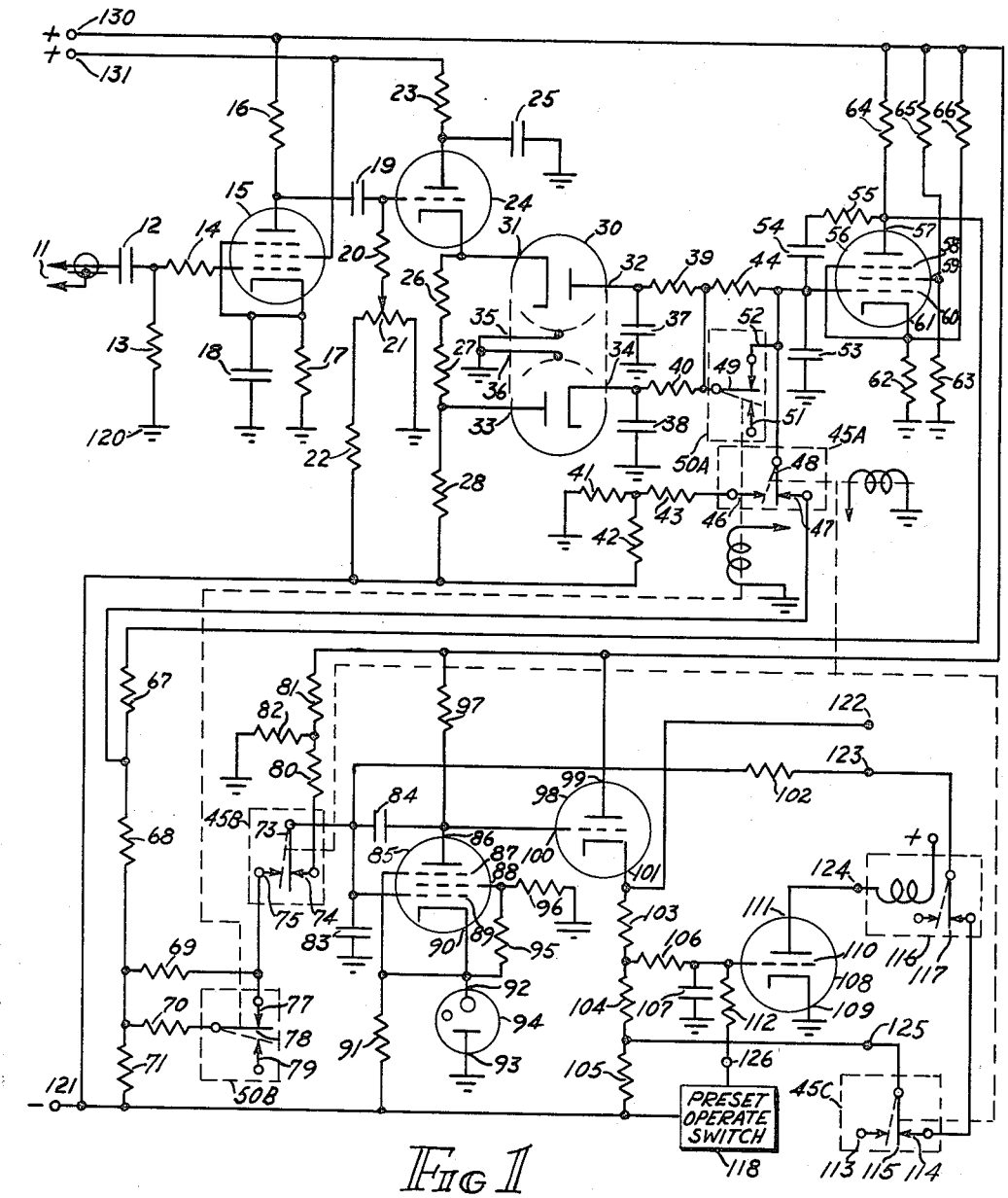

May 31, 1960

J. D. HAGUE ET AL 2,939,083

DOUBLE INTEGRATION MEMORY CIRCUIT RESPONDING TO BI-POLAR
PULSE VIDEO INPUT SIGNAL
Filed June 23, 1958

INVENTOR.
JOHN D. HAGUE
ROBERT L. HAYNES

BY

*N. H. Loesch*
ATTORNEYS

United States Patent Office 2,939,083
Patented May 31, 1960

2,939,083
DOUBLE INTEGRATION MEMORY CIRCUIT RESPONDING TO BI-POLAR PULSE VIDEO INPUT SIGNAL

John D. Hague, 6122 Carrollton Ave., and Robert L. Haynes, 7151 Madison Ave., both of Indianapolis, Ind.

Filed June 23, 1958, Ser. No. 744,024
11 Claims. (Cl. 328—150)
(Granted under Title 35, U.S. Code (1952), sec. 266)

The invention described herein may be manufactured and used by or for the Government of the United States of America for governmental purposes without the payment of any royalties thereon or therefor.

This invention relates to radar systems in general and more particularly to tracking circuits of radar systems.

The radar system of which this invention is a part was designed and developed to obtain range information for use by the range computer of aircraft fire control systems in the solution of problems involved in air-to-ground attacks, such as dive bombing, toss and loft bombing, and strafing attacks with fixed gunnery or rocketry. Though the present invention was originally a part of a radar system, it should be understood that its utility is not limited to radar systems.

With reference to an airborne radar system, the present invention is part of a system which measures the range between the aircraft and a point on the ground on the radar antenna boresight line, the slant range. When the slant range exceeds the range of the radar system, the system will be operating in the search stage. When the slant range comes within the range of the radar, a transition occurs called "lock-on," and the radar system then operates in the tracking stage, during which stage it produces a voltage proportional to the slant range. This voltage, called range voltage, is the range information provided by this radar system to the range computer of the fire control system.

The radar system transmits high frequency R.-F. pulses from the antenna which are reflected by the ground. The reflected "echo" signals which reach the antenna are used to determine the range between the antenna and the point where the antenna boresight line intersects the ground. Echo signals entering the antenna are mixed and handled in circuitry subsequent to the antenna producing, from a post amplifier unit, output signals called the difference video signals. These signals are bi-polar and the points at which they change from one polarity to the other are called "crossovers."

In the radar system there is a gate delay unit which provides a signal of very short duration to the circuits in which the difference video signals are developed. This signal of short duration is called the range gate, and it is during this gate that difference video signals enter a tracking unit for examination. That portion of the tracking unit embodying our invention is comprised, briefly, as follows: There is a difference video amplifier into which is fed the gated difference video signal. From the difference video amplifier the signal is fed to a difference video cathode follower where the signal is duplicated at the cathode of the follower. This signal on the cathode of the follower is then fed to pulse-stretching diodes, one or the other of which will conduct, depending on the polarity of the video signal supply. The diodes are coupled to subsequent resistance and capacitance elements to perform a signal detection as well as pulse-stretching function, the output voltage of which is called the error voltage and is proportional to a misalignment in time relationship between the range gate and the difference video crossover. This misalignment indicates that the range voltage output of the radar system is not yet a true indication of actual range. The abovementioned output voltage is fed to the control grid in a standard pentode Miller integrator stage. The output of this first integration stage is coupled to the grid of a second Miller integrator stage. The output of this stage is a voltage proportional to the target position (or range) and is directly coupled to the grid of an output cathode follower. From this cathode follower, voltages which are proportional to range are fed to the associated fire control computer as range voltage. This is the range information, to obtain which the radar system was designed. Range voltage is also fed to the above-mentioned gate delay unit to reposition, in time, the range gate to realign the range gate with the crossover. In the radar system the components, including the post amplifier, the tracking unit, and the gate delay unit, cooperate in what is known as the tracking loop of the radar system.

The second integrator stage of this invention performs two functions. During the searching stage of the radar range finding operation, this second integrator stage supplies a sawtooth voltage to the gate delay unit to assist in location of the target. This sawtooth voltage is called the search sawtooth. After location of the target and the subsequent transitional lock-on period, the second integrator ceases to function as a sawtooth generator and then provides the signal to the cathode follower where the range voltage output of the radar system is produced during the tracking stage.

It is an object of the present invention to provide a circuit responding to bi-polar input pulses for producing a voltage proportional to the slant range between the radar antenna and a point on the ground on the antenna boresight line.

It is a further object of the present invention to provide a circuit which, during the searching stage of the radar operation, can produce a sawtooth voltage sweeping between values of voltage which are proportional, to the maximum range and to the minimum range of the radar system.

It is also a concurrent object of the present invention to accomplish the other objects in a circuit which is simple, and easy to service, analyze, and modify to obtain any required operating characteristics.

Figure 2:
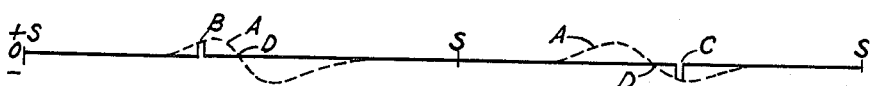

Additional objects and more specific advantages and possibilities of the present invention will become apparent when the invention is studied and the description is read using the drawing, in which:

Figure 1 illustrates a schematic circuit diagram of a preferred embodiment of the invention, and Figure 2 illustrates the type signals which the difference video and gated difference video are.

Referring to Figure 1 of the drawing, the gated difference video input is fed to the unit at the coaxial connector 11. Coupling capacitor 12 and resistor 14 are serially connected between connector 11 and the control grid of pentode 15, which pentode functions as a difference video amplifier. Resistor 13 is connected from the common junction between the capacitor 12 and resistor 14 to a terminal 120 at common potential (ground). Connected in parallel between the cathode of pentode 15 and ground are resistor 17 and capacitor 18. The anode of pentode 15 is connected through load resistor 16 to a source 130 of positive potential. The screen grid of pentode 15 is connected to another source 131 of a lower positive potential than source 130. Source 131 is connected through a resistance 23 to the anode of triode 24, which triode is used as the difference video cathode follower tube.

Connected between the anode of triode 24 and ground is decoupling capacitor 25. The anode of pentode 15 is coupled through coupling capacitor 19 to the control grid of triode 24. Resistor 20, serving as the cathode follower grid return resistor, is connected between the grid of triode 24 and an adjustable contact of a tracking loop balance potentiometer 21. This potentiometer is connected serially with resistor 22 between a source 121 of negative potential and ground. The cathode of triode 24 is serially connected with diode biasing resistors 26, 27, and cathode resistor 28 to the source 121 of negative potential. To the cathode of triode 24 is connected the cathode 31 of one-half of a dual diode 30, which diode serves the functions of pulse-stretching, detection, and isolation. To the junction between resistance 27 and resistance 28 is connected the anode 33 of the second half of dual diode 30. Shields 35 and 36 of each half of the dual diode 30 are connected in common to ground. The anode 32 of the first half of the dual diode 30 is connected through storage capacitor 37 to ground, while the cathode 34 of the second half of dual diode 30 is connected through storage capacitor 38 to ground.

The anode 32 and the cathode 34 of dual diode 30 are connected together through resistances 39 and 40. The common junction between resistances 39 and 40 is connected to the armature 49 of a delayed lock-on relay, referred to generally by the reference character 50 and having sections a and b, this section being 50a. In parallel with the armature 49 and fixed contact 52 of delayed lock-on relay section 50a is connected resistance 44. Fixed contact 52 is connected to the control grid 60 of pentode 56 of the first Miller integrator stage. Connected in shunt between control grid 60 and ground is smoothing capacitor 53. Also connected to grid 60 is the armature 48 of a lock-on relay, generally referred to herein by the reference character 45 and having three sections, a, b, and c, this section being 45a. Fixed contact 46 of lock-on relay section 45a is connected through resistance 43 which is connected in turn to a common junction between resistor 42 and resistor 41. Resistors 41 and 42 are connected serially between ground and the source 121 of negative potential, functioning as a voltage divider. Between the grid 60 and the anode 57 of pentode 56 are connected serially a capacitance 54 and a resistance 55 which are used to stabilize the tracking loop. The anode 57 is connected through resistance 64 to the source 130 of positive potential. The screen grid 59 of pentode 56 is connected through resistance 65 to the source 130 of positive potential, and through resistance 63 to ground. Cathode 61 of pentode 56 is connected through resistance 62 to ground and through resistance 66 to the source 130 of positive potential to establish bias potentials on these elements. Serially connected between the anode 57 of pentode 56 and the source of negative potential 121 are resistors 67, 68, and 71. To the common junction between resistors 67 and 68 is connected the fixed contact 47 of the lock-on relay section 45a. To the common junction between resistors 68 and 71 is connected resistor 69, which is connected in turn to the common connection between fixed contacts 75 of the lock-on relay section 45b, and fixed contact 77 of the delayed lock-on relay section 50b. To the common connection between resistances 68 and 71 is connected resistor 70, which is connected in turn to the armature 78 of delayed lock-on relay section 50b. Fixed contact 74 of lock-on relay section 45b is connected serially through resistors 80 and 81 to the source 130 of positive potential.

The common connection between resistors 80 and 81 is connected through resistor 82 to ground. The armature 73 of lock-on relay section 45b is connected through resistor 102 to a search disable input terminal 123 and also to the control grid 89 of a pentode 85 of the second Miller integrator stage. A capacitor 83 is connected between the grid 89 and ground, and a capacitor 84 is connected between this grid 89 and the anode 86 of pentode 85. Anode 86 is connected to the source 130 of positive potential through anode load resistor 97. Cathode 90 of pentode 85 is connected to the cathode 92 of a voltage regulator tube 94, the anode 93 of which is connected to ground. The cathode 90 of pentode 85 is also connected through resistor 91 to the source 121 of negative potential and directly to the suppressor grid 87. The screen grid 88 of pentode 85 is connected through resistance 95 to the cathode 90, and through resistance 96 to ground, providing a bias potential thereon from the negative source 121 through the resistance 91. The anode 86 of pentode 85 is connected to the grid 100 of the triode 98, which triode is used as an output cathode follower tube. The anode 99 of the triode 98 is connected to a source 130 of positive potential, and the cathode 101 is connected serially through the voltage dividing combination of resistors 103, 104, and 105 to the source 121 of negative potential to provide an operating potential across this tube. The cathode 101 is connected to a terminal 122 for range voltage output. The junction between resistors 103 and 104 is connected through current limiting resistance 106 to control grid 110 of a triode 108, which triode is used as a search control tube. Also connected to the grid 110 of this tube is resistor 112, which is connected in turn to terminal 126 for the preset-operate switch 118 (not shown in detail). To the anode 111 of search control tube 108 is connected terminal 124 for connection through the coil of the search relay 116 to an anode voltage supply while the cathode 109 is connected to ground to place this tube in an electrical circuit. Between the grid 110 and ground is connected storage capacitor 107 which, with resistor 106, produces an integrating effect.

Figure 1 of the drawing shows contacts of lock-on relay 45 located in three sections or gangs, 45a, 45b, and 45c, as shown enclosed by dashed lines. The armatures of this relay are operated in unison at the transitions between the searching stage and the lock-on stage by a relay energizing circuit of the radar system which is not part of this invention. The drawing shows, by solid lines, the location of the armatures of the relay during the searching stage, and by dashed lines, the location of the armatures during the tracking stage.

Similarly, contacts of the delayed lock-on relay 50 are shown located in two sections or gangs, 50a and 50b, as shown in the drawing enclosed by dashed lines. The armatures of this relay are operated in unison during transitions between the searching stage and the lock-on stage by a relay energizing circuit of the radar system which forms no part of this invention. The drawing shows, by solid lines, the location of the armatures during the searching stage, and by dashed lines, the location of the armatures during the tracking stage.

Operation

In the operation of the present invention during the searching stage, the sawtooth voltage is generated by voltage fed through the armature 73 and fixed contact 74 of the "lock-on" relay section 45b. This relay section connects the source 130 of positive potential through resistors 81 and 80 to the control grid 89 of the second integrator pentode 85. The effect of this connection is a slowly dropping anode potential on the pentode 85 while capacitor 84 charges, which potential is fed directly to the grid of the cathode follower triode 98. The slowly dropping potential on grid 100 of the cathode follower 98 is duplicated on the cathode 101 of the cathode follower and appears at the output terminal 122. This slowly dropping voltage produces the descending ramp of the search sawtooth. Because the cathode 101 of the cathode follower 98 is connected through resistors 103, 104, and 105 to the source of negative potential 121, as the potential on the cathode drops the potential at the junction between resistors 103 and 104 also drops, causing a drop in the potential on the grid 110 of the search control tube 108. This drop in grid potential on the search control tube causes the tube to cut off, with the result that the current in the anode 111 is cut off. Because the anode 111 is connected through terminal 124 to the operating coil of a search relay 116, the search relay is then de-energized. When the search relay is de-energized it closes a set 117 of contacts which connect the negative voltage appearing at terminal 125, through contacts 114, 115 of lock-on relay section 45c, the purpose of which will be explained below, to the input at terminal 123 providing a negative potential through resistance 102 to the control grid 89 of the pentode 85. This negative potential at the control grid causes the potential at the anode 86 of pentode 85 to rise sharply. This sharp rise in potential is fed to the control grid 100 of the cathode follower 98, resulting in a corresponding rise in the potential at the cathode 101, which is applied to the range voltage output terminal 122. This is the upward retrace of the search sawtooth. The amplitude of this sharp rise in voltage could be limited by the length of time during which the negative voltage is applied to the grid 89 of the pentode 85. This is because, as the voltage at the cathode 101 of the cathode follower 98 rises, the potential at the common connection between resistances 103 and 104 also rises, which would result in a similar rise in the potential on the grid 110 of search control tube 108, which would render it conducting again. This conduction would permit a current in the anode circuit of the search control tube to energize the search relay coil, which would in turn disconnect the negative voltage from the grid of the pentode 85, allowing grid voltage to rise again as capacitor 84 charges. This would initiate the slow decrease of anode potential, forming another ramp of sawtooth voltage. To obtain a true and uniform sawtooth voltage waveform, it is necessary that before permitting this immediate recurrence of the slowly decreasing anode potential on pentode 85 there be sufficient time to allow capacitors 83 and 84 to discharge completely and permit the voltage at the cathode 101 of output cathode follower 98 to rise and become stabilized at the desired value from which it is to begin decreasing to form the next ramp. This desired value will usually be a value representing a range slightly greater than the maximum range of the radar system. Adequate time is secured by using capacitor 107 which, in combination with resistor 106, prevents the potential at the grid 110 of the search control tube 108 from rising as quickly as does the potential at the common connection between resistors 103 and 104. Therefore, the search control tube 108 is maintained nonconducting for a time sufficient to allow retrace of the voltage on the cathode of the cathode follower to the proper voltage, before the search relay closes initiating the next successive downsweep of the cathode voltage.

On some occasions, because of tactical considerations, it is desirable to prevent generation of the searching sawtooth voltage by the radar system. To accomplish this, there is provided a "preset-operate" switch 118 which, when placed in the preset position, applies a voltage from the source 121 of negative potential to terminal 126 from which it is fed through resistance 112 to the grid 110 of the search control tube 108. This maintains the search control tube in the cut-off condition, which in turn causes the negative potential from terminal 125 to be applied through the contacts of the search relay 116 to the terminal 123 in the manner described above, causing a negative potential on the grid of pentode 85, maintaining a potential on the cathode 101 of the cathode follower 98, which is above that which would represent the maximum range voltage. Therefore, with the preset-operate switch 118 in the preset position, there appears at the output terminal 122, not a sawtooth voltage, but a substantially stable voltage greater than maximum range voltage.

It is to be noted that during the searching stage, the armature 48 of lock-on relay section 45a is in contact with fixed contact 47, as shown in the drawing by the solid line. It thereby connects the grid 60 of the first integrator stage pentode 56 with the voltage at the junction of resistors 67 and 68. The combination of resistors 64, 67, 68, and 71, connected serially between the source 130 of positive potential and the source 121 of negative potential, is designed to produce a voltage at the junction of resistors 67 and 68 which, when applied by the lock-on relay to the grid 60 of pentode 56 during the searching stage, serves to "cage" this first integrator stage at the condition corresponding to zero velocity. This prevents the occurrence of a spurious error signal on the grid 60 of the first integrator at the time of "lock-on," precluding a signal at the output 122 which would result from such a spurious error signal, thereby avoiding an unwarranted movement of the range gate.

When during the searching stage the distance between the radar antenna and the ground on the boresight line between the antenna and ground decreases to an amount which is within the range of the radar system, the transition from the searching stage to the tracking stage, "lock-on," occurs. At this time the circuitry of the present invention must be switched from a sawtooth generator to a circuit capable of supplying range information derived from the difference video signals produced in the radar receiver. The switching performed at "lock-on" is initiated by circuitry in the radar system which is not a part of this invention but is accomplished in the circuitry of this invention by the lock-on and delayed lock-on relays. At "lock-on" the relay 45 is switched whereby armature 73 of lock-on relay section 45b moves from contact with fixed contact 74 to contact with fixed contact 75, as shown in the drawing by the dashed line. This disconnects from the grid 89 to pentode 85 the source 130 of positive potential and connects the output of the first integration stage to the grid of pentode 85. To describe the operation of the invention during the tracking stage it will be best to start with the difference video input to the tracking unit.

In the operation of the present invention during the tracking stage, gated difference video input signals obtained from the I.-F. receivers of the radar system are applied to terminal 11 of the tracking unit. Figure 2 of the drawing shows, as dashed curve A, the difference video signal. The solid line represents gated difference video input, such as would be applied to terminal 11, and shows a positive pulse B illustrating the type pulse occurring when the range gate is ahead of the crossover D, and a negative pulse C illustrating the type pulse which occurs when the range gate is behind the crossover D. It will be apparent that when the range gate is aligned with the crossover, there will be practically no pulse. The lines marked S represent time references, being the times at which short bursts of R.-F. pulses are transmitted from the radar antenna. The gater difference video signals are coupled through capacitor 12 and resistor 14 to the control grid of the difference video amplifier 15. Because the difference video signal is a bi-polar signal, the gated portion may be of either polarity, depending upon the timing of the range gate, so the difference video amplifier must be able to amplify with equal ease both positive and negative signals. The amplified video appears at the anode of the amplifier 15 and is coupled through capacitor 19 to the grid of the difference video cathode follow 24. Also feeding the grid of the difference video cathode follower is the tracking loop balance circuit, which includes the cathode follower grid return resistor 20, the tracking loop balance potentiometer 21, and the resistor 22. This tracking loop balance circuit has no effect on the pulse waveform existing at the grid of the cathode follower 24, but is useful during calibration of the radar to minimize range voltage drift with the circuitry in "lock-on" stage by allowing the cathode of the cathode follower to be positioned over a small range of potential levels.

The difference video cathode follower has as its primary function to provide a low impedance output signal to drive the diode detectors immediately following. When the difference video is applied to the control grid of the difference video cathode follower, the signal is faithfully duplicated at the cathode and fed to the cathode 31 and through resistors 26 and 27 to the anode 33 of the dual diode 30. When this occurs, one of the portions of the dual diode will conduct, depending on the polarity of the signal supplied. If a positive signal appears at the cathode of the cathode follower 24, current will flow through the anode 33 and cathode 34 of the dual diode 30, and capacitor 38 will charge to approximately the peak of the difference video pulse. In this case of a positive signal, there will be no current conduction through the cathode 31 and anode 32 of the other half of dual diode 30. Therefore, capacitor 38 will be charged to the peak of the positive pulse fed to it from the difference video cathode follower and capacitor 37 will have no charge. After either half of the diode 30 has conducted and applied a charge on one of the charging capacitors, it will appear as an open circuit to the charged capacitor after the video peak has passed. The resulting charges on the capacitors are resistive mixed by resistor 39 and resistor 40. The voltage existing at the junction of these two resistors is equal to one-half of the voltage to which capacitor 38 is charged plus one-half of the voltage to which capacitor 37 is charged, and represents a voltage proportional to the misalignment in time relationship of the range gate and the difference video "crossover." This voltage can be regarded as an error signal. During tracking this error signal is fed from the common connection between resistors 39 and 40, through resistor 44 to the control grid 60 of a standard pentode Miller integrator stage. At this time the shunt across resistor 44 has been broken by armature 49 of delayed lock-on relay section 50a moving to the position shown dotted in the drawing. The integration performed on this signal may be considered approximately the same as if the diodes were followed by an "L" integration network consisting of series resistor 44 and a shunt capacitor 54, the effective capacity of which is equal to the actual capacity of capacitor 54 multiplied by a factor equal to the quantity (1+the gain of the stage). The Miller circuit has two distinct advantages in that:

(1) It requires error signals of a relatively low amplitude for its operation.

(2) It provides a good deal of smoothing with rather small capacitors due to the impedance transformation properties of the stage.

The output of the first integration stage appears at the anode 57 of pentode 56. This signal is D.C. coupled through resistors 67, 68, and 69, contact 75, and armature 73 (in the dotted line position) of lock-on relay section 45b, to the grid of the second Miller integrator pentode 85. After the second integration, occurring in this stage, a voltage proportional to the distance between the antenna and a point on the ground on the antenna boresight line (range) appears at the anode 86 of this stage and is directly coupled to the grid 100 of a cathode follower triode 98. The D.C. voltage changes at the cathode of the cathode follower triode 98 are duplicates of those on the grid 100 and are fed to terminal 122 from which they are fed to the associated fire control computer (not shown) as "range volts." They are also fed from terminal 122 to the gate delay unit (not shown) of the radar system for repositioning of the range gate toward time coincidence with the "crossover."

Initially, at lock-on, resistor 44 is shunted by the armature 49 in contact with fixed contact 52 of the delayed lock-on relay section 50a. Similarly, at initial lock-on, armature 78 of the delayed lock-on relay section 50b is maintained in contact with fixed contact 77 connecting resistor 70 in parallel with resistor 69. In this manner the delayed lock-on relay 50 provides for integration time constants which are smaller than those required for tracking. The delayed lock-on relay 50 is maintained in this condition by the lock-on and AGC unit of the radar system (not shown and not a part of this invention) for a short length of time after initial lock-on to allow the range gate to rapidly "seek" the "crossover." The smaller integration time constants permit a stronger output signal to appear on the cathode 101 of the output cathode follower 98 for a given error signal developed the the junction of resistors 39 and 40 than would otherwise appear. This stronger output signal, when fed from terminal 122 to the gate delay unit of the radar system (not shown), causes it to move the range gate farther in the direction required for time coincidence with the crossover than it would move if the signal applied were the voltage developed by the longer integration time constants. It is in this manner that the range gate more rapidly "seeks" the crossover. But, during tracking, longer integration time constants are desirable to produce at the output a range voltage of the proper proportionality to range. The greater resistance providing longer time constants also minimizes noise in the range voltage signal. So, at the end of the short length of time during which smaller time constants are desired, the armature 49 of the delayed lock-on relay section 50a moves to the open circuit position in contact with fixed contact 51, as shown in the drawing by the dashed line. Simultaneously, armature 78 of delayed lock-on relay section 50b moves to the open circuit position, shown in the drawing by a dashed line, out of contact with fixed contact 77 into contact with fixed contact 79. This results in the significantly longer tracking time constants.

Initially, at lock-on, the armature 48 of lock-on relay section 45a moves to the position, shown in the drawing by a dashed line, in contact with fixed contact 46, connecting the grid 60 of the pentode 56 through resistor 43 to the voltage divider, consisting of resistor 41 connected to ground and resistor 42 connected to the source 121 of negative potential. This causes the range gate to drift inward during any interval in which no error signal is being fed to the tracking loop. By drifting inward means that the range gate produced by the gate delay unit occurs sooner after the transmission of an R.-F. signal pulse from the radar antenna toward the ground than it normally would. As the aircraft approaches the ground, such as during an attack, the echo signals returning from the ground also occur sooner after transmission. As a consequence, the difference video crossover occurs sooner. This suggests that the inward drift tends toward maintenance of alignment between the range gate and the crossover. This inward drift is of particular advantage because, due to the arrangement of the antenna and the manner of transmitting R.-F. pulses and of receiving echo signals from the ground, the video signals on one side of the crossover are stronger than on the other side and there is a slight tendency for them to cause the range gate to occur late instead of permitting it to occur sooner as the aircraft approaches the ground. Therefore the circuit is designed to provide an automatic inward drift at lock-on during the tracking stage. The result is smoother, more positive, and more accurate tracking than would otherwise be possible, particularly when the aircraft is flying at low radar grazing angles.

The inward drift occurs because, when no error signal is fed to the grid 60 of the pentode 56, a negative voltage from the voltage divider composed of resistors 41 and 42 is fed through resistor 43 and the contacts 46 and 48 of the lock-on relay section 45a to the grid 60. This negative voltage produces, by means of the two pentodes and attendant circuitry, a voltage moving negatively in the cathode follower output at terminal 122. In other words, range voltage drifts negatively. This range voltage is fed to the gate delay unit of the radar system (not shown) where it causes the range gate to occur sooner after an R.-F. pulse is transmitted from the antenna. The range gate therefore drifts inwardly. However, this effect is easily overcome by an error signal occurring at the junction of resistors 39 and 40. The drift effect, therefore, does not interfere with the precise alignment of the range gate and crossover made possible by the error signals when they occur.

As the range decreases during the tracking run, capacitor 84 charges and the voltage at the anode 86 continues its slow decrease, followed by that on the cathode 101 of the output cathode follower. As this voltage decreases, it is apparent that the search tube 108 reaches cutoff just as it did during the searching stage. During the searching operation this results in application of a negative voltage through the search relay to the grid of the second integrator tube and causes an upward retrace of the output voltage at terminal 122. This is, of course, undesirable during the tracking stage because the output voltage at terminal 122 must represent range, and as the aircraft approaches the ground this voltage must continue to decrease as the range decreases. To avoid the retrace, a set of contacts of the lock-on relay section 45c is included in series with the search relay 116 in the circuit which applies the negative voltage to the control grid 89 of the second integrator pentode. When lock-on occurs, armature 115 of the lock-on relay 45 moves from contact with fixed contact 114 into contact with fixed contact 113, as shown by the dashed line in Figure 1 of the drawing. This opens the circuit and prevents the negative voltage from being applied to the grid of pentode 85. Therefore, during tracking, the range voltage can decrease to zero without a retrace.

To obtain voltages on the cathode 101 of the cathode follower 98 which are within the limits required for range voltages, which must be able to drop to zero, it is necessary that the grid voltage on the cathode follower be able to drop to a voltage below ground. Therefore, it is necessary that the voltage on the anode 86 of the second integrator pentode 85 be capable of being slightly below ground. The voltage regulator tube 94 makes this possible by clamping the cathode 90 of the pentode 85 at a negative potential. Resistor 91 connected to the source 121 of negative potential provides a current path for the voltage regulator tube in order to maintain the correct current operating range for the regulator tube. In addition to its clamping effect the regulated voltage, established at the cathode 90 of the pentode 85, provides a regulated D.C. voltage source for the screen 88 of pentode 85.

While this description has concerned the preferred embodiment of the invention with reference to a radar system, there are many other possible variations in structure and features to adapt it to other uses, so it should be understood that we wish to be limited only by the scope of the following claims.

We claim:

1. An electronic circuit for generating sawtooth voltages and for switchably analyzing applied voltage signal intelligence comprising: generator means for generating sawtooth voltages on an output circuit thereof; a circuit for receiving voltage intelligence signals of both polarities, said circuit including an integrating circuit for analyzing said intelligence signals into resultant intelligence signals; coupling circuits between said circuit for receiving and analyzing and said generator means, for coupling said intelligence signals to said generator means, said generator means being switchable to respond to said resultant intelligence signals for controlling a voltage on the output circuit thereof; and switch means in said generator means, said circuit for receiving voltage intelligence signals, and in said coupling circuits for selectively switching controlled voltage and sawtooth voltages on said generator means output, said switch means including two separately controlled switch gangs, one switch gang being of delayed operation used in the circuit for receiving voltage intelligence signals to change the time constants of said integrating circuit.

2. An electronic circuit as set forth in claim 1 wherein said circuit for receiving voltage signal intelligence has a cathode follower space discharge device for receiving said voltage signal intelligence on its grid, a double diode having one anode and one cathode coupled to the cathode of said cathode follower, and a summing network coupling the other cathode and other anode of said double diode for summing the voltage intelligence signals of both polarities, said summing network being coupled to said integrating circuit for producing resultant intelligence signals over said coupling circuits, one gang of said delayed operation switch being arranged to shunt said summing network; and wherein said generator means includes a second integrating circuit having its input coupled to said coupling circuits and its output coupled to the grid of a cathode follower output space discharge device, said coupling circuits switch means being switchable in one condition to place said resultant voltage signals in circuit with said second integrating circuit to produce a direct current voltage on the cathode follower output space discharge device, and in the other condition to place a predetermined voltage in circuit with said integrating circuit to cause the generation of sawtooth voltages on the cathode follower output.

3. An electronic circuit as set forth in claim 2 wherein said generator means includes a triode controlled relay switch, said switch being in a circuit for placing a negative voltage in circuit with said second integrating circuit after a predetermined voltage level has been reached in said generated sawtooth ramp to return the voltage on the cathode follower output to the proper level for initiation of a succeeding sawtooth ramp.

4. In radar search and lock-on circuitry for slant range computation comprising: generator circuit means for generating sawtooth voltage waves on an output conductor means to provide repeated search voltages passing through voltage amplitudes representative of range, said generator circuit means including an integrating network; a signal analyzing circuit having an input for receiving bi-polar difference signals and including an integrating network, said analyzing circuit being for producing resultant direct current voltage signals in an output thereof, said output being connected through coupling circuits to said generator circuit means; and electrical switch means in said generator circuit means, said signal analyzing circuit, and said coupling circuits, said electrical switch means being in gangs with each gang having alternate contact positions for search and lock-on, respectively, whereby in the search position of said switch means sawtooth voltages are produced on the output of said generator circuit means and in the lock-on position a voltage is produced on the output of said generator circuit means representative of range, the gangs of said electrical switch means including a gang switch coupled to the input of each said integrating network to change the time constant therefor, said gang switches which are coupled to the said integrating networks being delayed in actuating time from the search position to the lock-on position to allow said difference video signals to reduce to zero whereby the switching from the search to the lock-on position provides a range voltage representation at a point of crossover of the oppositely poled difference video signals.

5. In radar search and lock-on circuitry for slant range computation comprising: a signal analyzing circuit including a cathode follower space discharge device for receiving said bi-polar difference video signals from an input, means for passing and storing signals of each polarity separately, a summing network connected to said last-mentioned means for summing stored signals, and an integrating circuit coupled to said summing network for integrating the summed signals to produce resultant direct current voltage signals in an output thereof, said output being connected to coupling circuits; generator circuit means connected to said coupling circuits for generating sawtooth voltage waves on an output conductor means to provide repeated search voltages passing through voltage amplitudes representative of range said generator circuit means including a second integrating circuit for integrating signals conducted over said coupling circuits, and a cathode follower space discharge device coupled to the output of said second integrating circuit for reproducing signals from said second integrating circuit on said output conductor; and electrical switch means in said generator circuit means, said signal analyzing circuit, and said coupling circuits, said electrical switch means being in gangs with each gang having alternate contact positions for search and lock-on, respectively, for producing in the search position of said switch means sawtooth voltages on the output of said generator circuit means and in the lock-on position a voltage on the output of said generator circuit means representative of range, said switch means including a first switch, one gang of which is placed in shunt to said summing network and a second gang of which is placed in parallel to said coupling circuits and a voltage source, and said switch means including a second switch, one gang of which switches the bias on said first integrating circuit and a second gang of which switches said second integrating circuit from a fixed potential to said first integrating circuit, said first switch being operatively delayed in actuation with respect to said second switch in switching from the search position to the lock-on position whereby upon switching from the search position to the lock-on position spurious voltage signals are avoided in said coupling circuits, and the voltage produced at the output of said generator means is highly responsive to said difference video signals during said delay in actuation.

6. In radar search and lock-on circuitry as set forth in claim 5 wherein said first and second integrating circuits each include, a space discharge device, the second of which has a cathode with a voltage regulator thereon and the input signals applied to a grid of each thereof, and in the search position of said electrical switch means said one gang of said first switch is in shunt to said summing network and said second gang of said switch connects said voltage source, and said one gang of said second switch is connected to a voltage biasing supply and said second gang of said second switch connects said fixed potential enabling said generator circuit means to generate search voltages; and in the lock-on position of said electrical switch means said first switch switches the gangs thereof to open circuit and said second switch switches said one gang to connect said first integrating circuit to a negative bias and said second gang to connect said first and second integrating circuits through said coupling circuits to produce a voltage representative of range on the output conductor means of said generator circuit means.

7. In radar search and lock-on circuitry as set forth in claim 6 wherein said generator circuit means includes a relay controlling space discharge device having a grid and anode, the grid of which is impedance coupled to the output conductor means and the anode of which is coupled to electromagnetically control a relay switch, said relay switch being in a conductor for conducting a negative voltage bias to the second integrating circuit, the application of which bias disables said second integrating circuit to produce the retrace in said generated sawtooth voltages; and second switch of said electrical switching means further includes a third gang switch in said conductor for conducting a negative voltage bias to said second integrating circuit.

8. A circuit in lock-on and search circuitry for pulse stretching and detection of bi-polar pulse signals comprising: a cathode follower space discharge device for receiving bi-polar pulse signals and reproducing same on a cathode thereof having a negative voltage applied thereto through an impedance; a biased double diode having one cathode coupled directly to said space discharge device cathode and one anode coupled to a point in said impedance; resistance-capacitance network means coupled to each of the other anode and cathode of said double diode for storing positive and negative signals, respectively, and for summing stored voltages whereby substantially stable direct current voltage is produced at an output changeable in magnitude in response to the average magnitude and polarity of the bi-polar pulse signals and voltage level at said output is determinable by bias on said space discharge device.

9. A circuit in radar lock-on and search circuitry for producing search voltages comprising: a first space discharge device in a circuit, said discharge device having a grid input for receiving a biasing voltage and an anode coupled to a chargeable means and said discharge device producing at said anode a linearly decreasing voltage level; a cathode follower circuit having a grid coupled to said chargeable means and a cathode coupled through impedance means to a negative voltage supply, said cathode being coupled directly to an output conductor for producing a linearly decreasing voltage level at said output conductor; and a second space discharge device having a grounded cathode, a grid coupled at a point in said impedance means, and an anode coupled through a relay control coil to a voltage source, said relay having switch contacts in a biasing conductor for connecting a negative voltage source to said grid of said first space discharge device when said second space discharge device becomes nonconductive to produce a negative bias on said first space discharge device and thereby cause a voltage rise on said output conductor, said voltage rise reinstating conduction in said second space discharge device to complete a cycle and initiate another whereby sawtooth voltages are produced on said output conductor.

10. A circuit as set forth in claim 9 wherein said grid input of said first space discharge device for receiving biasing voltage has means connected in said input for selectively switching from said biasing voltage to a variable voltage representative of velocity to produce voltages on said output conductor representative of range distance.

11. A circuit as set forth in claim 9 wherein said grid coupling of said second space discharge device to a point in said impedance includes a capacitor to ground to prolong the nonconductive cycle of said second space discharge device.

References Cited in the file of this patent
UNITED STATES PATENTS

| | | |
|---|---|---|
| 2,413,913 | Duke | Jan. 7, 1947 |
| 2,652,489 | Robinson | Sept. 15, 1953 |
| 2,654,003 | Dashiell | Sept. 29, 1953 |
| 2,686,877 | Lawson | Aug. 17, 1954 |
| 2,752,511 | Beaufoy | June 26, 1956 |
| 2,887,578 | Wolf | May 19, 1959 |